(12) United States Patent
Izuma

(10) Patent No.: US 10,814,827 B2
(45) Date of Patent: Oct. 27, 2020

(54) GAS GENERATOR

(71) Applicant: DAICEL CORPORATION, Osaka-shi, Osaka (JP)

(72) Inventor: Toshihiro Izuma, Tatsuno (JP)

(73) Assignee: DAICEL CORPORATION, Osaka-Shi (JP)

(*) Notice: Subject to any disclaimer, the term of this patent is extended or adjusted under 35 U.S.C. 154(b) by 218 days.

(21) Appl. No.: 16/072,746

(22) PCT Filed: Mar. 29, 2017

(86) PCT No.: PCT/JP2017/012781
§ 371 (c)(1),
(2) Date: Jul. 25, 2018

(87) PCT Pub. No.: WO2017/179421
PCT Pub. Date: Oct. 19, 2017

(65) Prior Publication Data
US 2019/0061677 A1   Feb. 28, 2019

(30) Foreign Application Priority Data

Apr. 12, 2016   (JP) .................... 2016-079257

(51) Int. Cl.
*B60R 21/264* (2006.01)
*B01J 7/00* (2006.01)
*B60R 21/26* (2011.01)

(52) U.S. Cl.
CPC ............. *B60R 21/264* (2013.01); *B01J 7/00* (2013.01); *B60R 21/26* (2013.01); *B60R 2021/26029* (2013.01); *B60R 2021/26076* (2013.01)

(58) Field of Classification Search
CPC ........ B60R 2021/26076; B60R 21/264; B60R 21/2644
See application file for complete search history.

(56) References Cited

U.S. PATENT DOCUMENTS 7,347,448 B2 *   3/2008   Smith .................... B60R 21/26
                                                          280/736
7,654,565 B2 *   2/2010   McCormick ........ B60R 21/2644
                                                          280/736

(Continued)

FOREIGN PATENT DOCUMENTS

JP   2009-517263 A   4/2009
JP   2009-519173 A   5/2009

(Continued)

*Primary Examiner* — Nicole T Verley
(74) *Attorney, Agent, or Firm* — Birch, Stewart, Kolasch & Birch, LLP

(57) ABSTRACT

A gas generator includes, a housing having a top plate, a bottom plate, and a circumferential wall having a gas discharge port. In the housing, a cylindrical member having a first communication hole in a circumferential wall is disposed along an axis of the housing. In the cylindrical member, an igniter attached to the bottom plate and a transfer charge charged in a space accommodating the igniter are provided. A cup-shaped member including a bottom surface, a circumferential wall, and an opening is disposed such that the circumferential wall is abutted against an inner wall surface of the cylindrical member. The opening is located opposing the top plate and the bottom surface has a second communication hole facing the transfer charge. A gas generating agent is charged in a space outside and inside the cylindrical member, and an annular sealing member abuts against the bottom surface and the inner wall.

12 Claims, 4 Drawing Sheets

(56) References Cited

U.S. PATENT DOCUMENTS

| | | | |
|---|---|---|---|
| 8,567,319 B2* | 10/2013 | Ukita | B60R 21/2644 |
| | | | 102/530 |
| 9,566,938 B2* | 2/2017 | Kobayashi | B60R 21/274 |
| 10,179,561 B2* | 1/2019 | Jung | B28B 1/001 |
| 10,625,706 B2* | 4/2020 | Fukumoto | C06D 5/00 |
| 2008/0136152 A1 | 6/2008 | McFarland | |
| 2010/0007123 A1 | 1/2010 | Cord et al. | |

FOREIGN PATENT DOCUMENTS

| | | |
|---|---|---|
| JP | 2009-149215 A | 7/2009 |
| WO | WO 2007/064423 A2 | 6/2007 |

* cited by examiner

[Fig. 1]
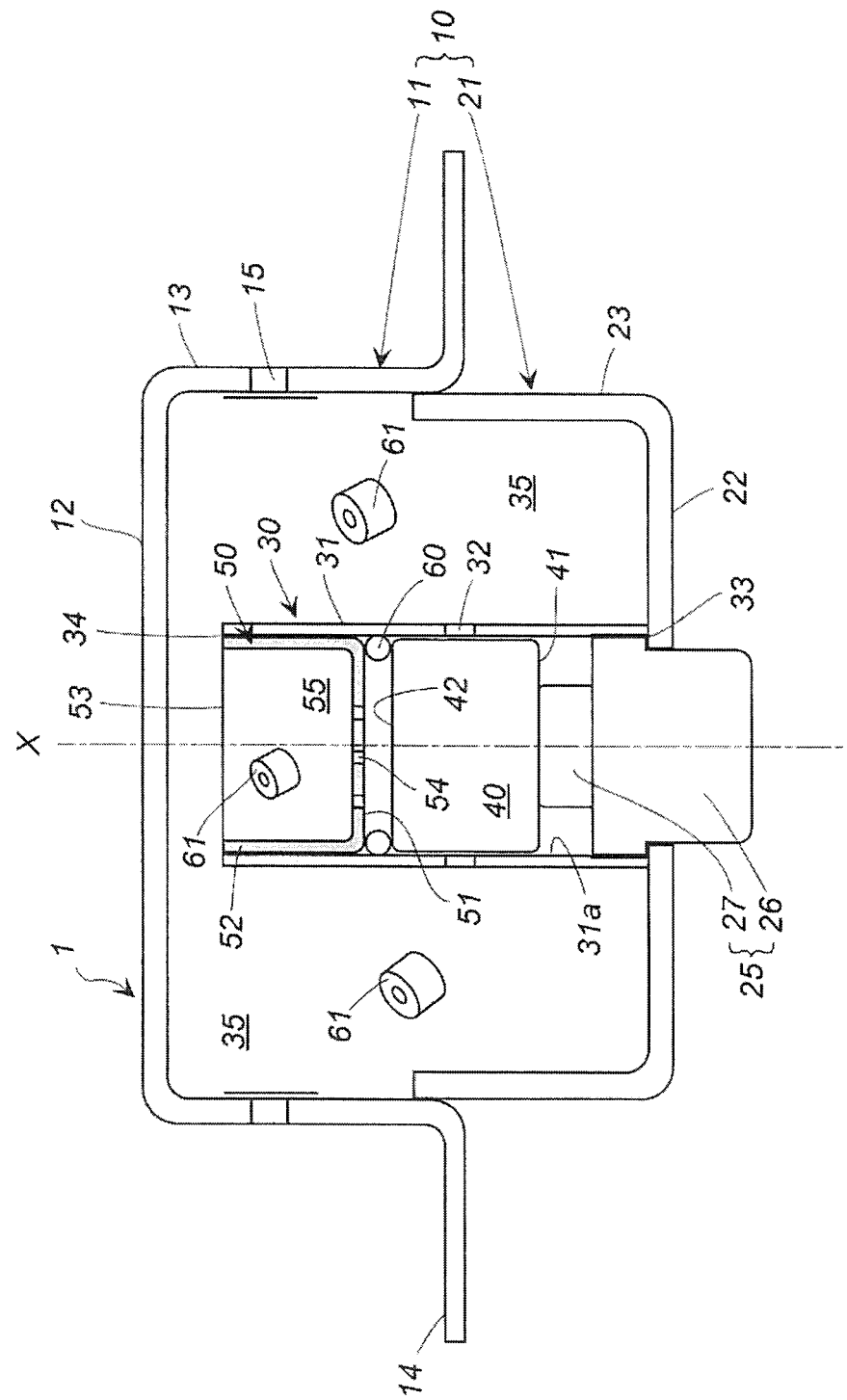

[Fig. 2]
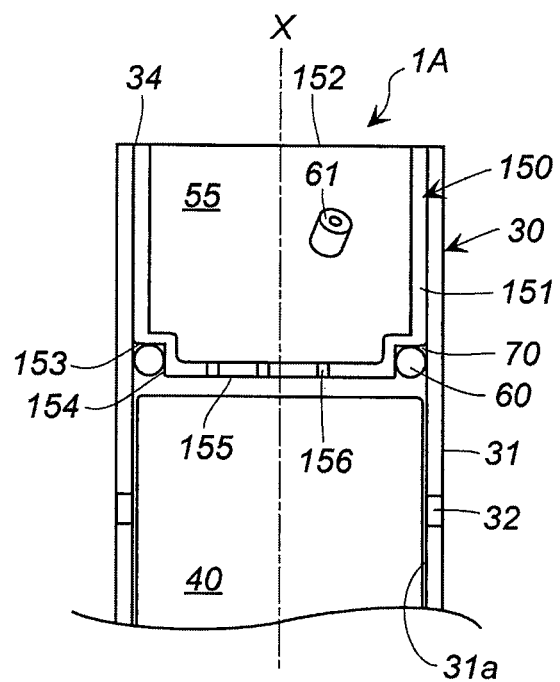

[Fig. 3]
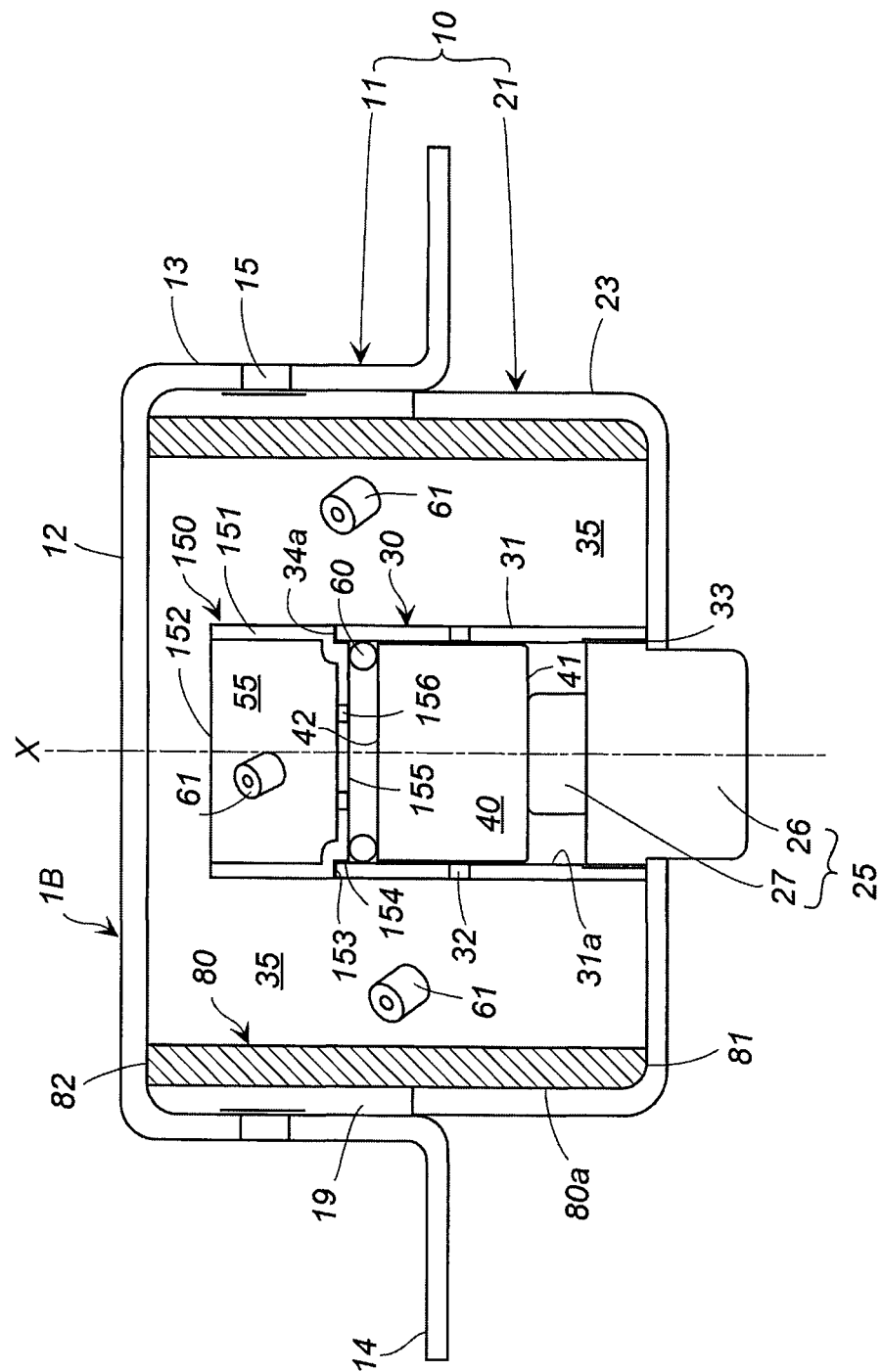

[Fig. 4]
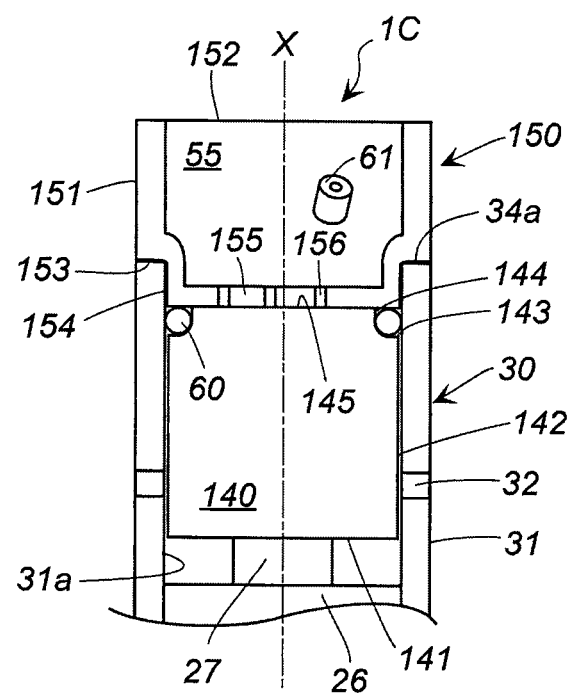

GAS GENERATOR

FIELD OF INVENTION

The present invention relates to a gas generator usable in an airbag apparatus or the like.

DESCRIPTION OF THE RELATED ART

U.S. Pat. No. 7,347,448 discloses an invention of a pyrotechnic inflator used in an airbag apparatus for an automobile.

A squib 234 is disposed inside a housing 202 and an igniter cup 260 is disposed to surround the squib 234.

In the igniter cup 260, both ends 270 and 272 are open and a gas exit orifice 274 is formed in a side wall 268. A canister 276 filled with an igniter material is disposed inside the igniter cup 260.

An igniter cup insert 264 is disposed above the canister 276, and a bottom surface thereof is provided with a gas exit orifice 275.

When the ignitor material inside the canister 276 is burnt, a combustion product thereof passes through the gas exit orifices 274 and 275 to ignite a gas generating agent present on extension lines thereof.

SUMMARY OF THE INVENTION

A first aspect of the present invention (hereinafter, referred to as "the first aspect") provides a gas generator, including:
a housing having a top plate, a bottom plate and a circumferential wall formed with a gas discharge port, in the housing,
a cylindrical member being disposed along an axis of the housing and having a first communication hole in a circumferential wall thereof,
an igniter being disposed inside the cylindrical member and attached to the bottom plate of the housing,
a transfer charge being charged in a space accommodating an ignition portion of the igniter inside the cylindrical member,
a cup-shaped member including a bottom surface, a circumferential wall and an opening and being disposed such that at least part of the circumferential wall is abutted against an inner wall surface of the cylindrical member, the opening is located on the side of the top plate of the housing and the bottom surface having a second communication hole faces the transfer charge,
a gas generating agent being charged in a first space outside of the cylindrical member and in a second space inside the cup-shaped member, and
an annular sealing member being disposed to be abutted against at least the bottom surface of the cup-shaped member and the inner wall surface of the cylindrical member.

A second aspect of the present invention (hereinafter, referred to as "the second aspect") provides a gas generator, including:
a housing having a top plate, a bottom plate and a circumferential wall formed with a gas discharge port, in the housing,
a cylindrical member being disposed along an axis of the housing and having a first communication hole in a circumferential wall thereof,
an igniter being disposed inside the cylindrical member and attached to the bottom plate of the housing,
a transfer charge container being charged with a transfer charge and disposed to face an ignition portion of the igniter inside the cylindrical member,
a cup-shaped member including a bottom surface, a circumferential wall and an opening and being disposed such that at least part of the circumferential wall is abutted against an inner wall surface of the cylindrical member, the opening is located on the side of the top plate of the housing and the bottom surface having a second communication hole faces the transfer charge container,
a gas generating agent being charged in a first space outside the cylindrical member and in a second space inside the cup-shaped member, and
an annular sealing member being disposed to be abutted against at least the bottom surface of the cup-shaped member and the inner wall surface of the cylindrical member.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a cross-sectional view in an axis X direction of a gas generator according to one embodiment of the present invention;

FIG. 2 shows a partial cross-sectional view in an axis X direction of a gas generator according to another embodiment of the present invention;

FIG. 3 shows a cross-sectional view in an axis X direction of a gas generator according to still another embodiment of the present invention; and FIG. 4 shows a partial cross-sectional view in an axis X direction of a gas generator according to still another embodiment of the present invention.

DETAILED DESCRIPTION OF INVENTION

In the gas generator disclosed in U.S. Pat. No. 7,347,448, when the igniter material inside the canister 276 is burnt, it is assumed that a combustion gas flows through a gap between the igniter cup 260 and the igniter cup insert 264. In such a case, an ignition property of the gas generating agent on the extension line of the gas exit orifice 275 deteriorates.

In the gas generator of the present invention, an ignition property of the whole gas generating agent charged in a housing is improved.

The housing is a housing used in a known gas generator and obtained by joining a diffuser shell, which is provided with a plurality of gas discharge ports, and a closer shell at a contact portion.

A cylindrical member is formed of a metal of the same material (iron, stainless steel, or the like) as the housing, and is arranged such that a first end thereof is abutted against a bottom plate of the housing and a second end thereof faces a top plate of the housing. The second end and the top plate may face each other with a gap therebetween or may be abutted against each other.

A first communication hole for discharging a combustion product generated by combustion of a transfer charge is formed in a circumferential wall of the cylindrical member.

A height of the cylindrical member is determined in relation to a cup-shaped member, such as to be within a range between the bottom plate and the top plate of the housing.

An igniter same as that used in a known gas generator may be used. For example, an igniter in which an igniter main body having an ignition portion and an electro-conductive pin is fixed by a resin to a metallic igniter collar is used.

When the igniter is attached to the bottom plate of the housing, the igniter collar is fitted and fixed to the inside of a hole formed in the bottom plate, but a fixing structure of the igniter is not limited thereto, and a known fixing structure can be employed.

The cup-shaped member is formed of a metal of the same material (iron, stainless steel, or the like) as the housing, and is disposed such that at least part of a circumferential wall thereof is abutted against the inner wall surface of the cylindrical member, an opening is located on the side of the top plate of the housing, and a bottom surface faces the transfer charge.

The bottom surface of the cup-shaped member has a second communication hole for discharging a combustion product generated by combustion of the transfer charge, and a plurality of second communication holes are formed in a portion excluding a circumferential edge of the bottom surface.

A gap may be formed between the top plate of the housing and the opening of the cup-shaped member.

The circumferential wall of the cup-shaped member may have a plurality of notches or through-holes formed in a portion close to the opening. Moreover, a notch or a through-hole may be formed at an opening of the cylindrical member on the side of the top plate of the housing to be matched with the notch or the through-hole of the cup-shaped member.

As long as the bottom surface of the cup-shaped member faces the transfer charge, the bottom surface may be abutted against the transfer charge or face the transfer charge with a gap therebetween.

The cup-shaped member and the cylindrical member are combined preferably such that a central axis of the cup-shaped member coincides with a central axis of the cylindrical member.

Preferably, at least part of the circumferential wall of the cup-shaped member is press-fitted into the inner wall surface of the cylindrical member or the cup-shaped member is partially welded with respect to the cylindrical member (for example, the circumferential wall is welded at a plurality of positions in the circumferential direction).

The cup-shaped member may be formed of a combination of a cylinder and a lid member (a partitioning wall) which closes one opening of the cylinder.

Inside the housing, a gas generating agent is charged in a first space outside the cylindrical member and a second space inside the cup-shaped member.

The first space is a space outside the cylindrical member and is an entire space excluding the second space in the cup-shaped member.

The gas generating agent may be the same gas generating agent as that used in a known gas generator.

The gas generating agent charged in the first and second spaces may have the same shape, dimensions, composition ratio, and the like, or may have different shapes, dimensions, composition ratios, and the like.

An annular sealing member may be disposed to be abutted against at least the bottom surface of the cup-shaped member and the inner wall surface of the cylindrical member and may be further abutted against the transfer charge.

The annular sealing member may be formed of rubber, a resin, or metal.

In the gas generator of the present invention, a known coolant-filter, retainer, and the like may be disposed in the housing as necessary.

When an igniter is actuated, the transfer charge is ignited and burnt to generate a combustion product (a flame and a high-temperature combustion gas).

Part of the combustion product is discharged from the first communication hole of the cylindrical member into the first space to ignite and burn the gas generating agent, and a combustion gas is generated.

A forming position and the number of the first communication hole are determined in view of an ignition property of the gas generating agent in the first space.

The remaining part of the combustion product is discharged from the second communication hole in the bottom surface of the cup-shaped member into the second space to ignite and burn the gas generating agent, and a combustion gas is generated. At this time, since the annular sealing member is disposed, no combustion product passes through a contact portion between the inner wall surface of the cylindrical member and the circumferential wall of the cup-shaped member.

Out of the combustion product generated by combustion of the transfer charge, a prescribed amount to be provided into the second space is secured, so that, in particular, the ignition performance of the gas generating agent in the second space is maintained and the ignition property and the combustion property of the whole gas generating agent are improved.

The combustion gas generated in the first and second spaces is discharged from the gas discharge port.

The invention of a second aspect is different from the invention of the first aspect in that a transfer charge container is used.

The transfer charge container may be the same transfer charge container as that used in a known gas generator. For example, a column-shaped container formed of aluminium or a resin can be used as the transfer charge container.

The transfer charge container is disposed in the cylindrical member in such a state that a bottom surface thereof faces the ignition portion of the igniter and a top surface thereof faces the bottom surface of the cup-shaped member.

The top surface of the transfer charge container may be abutted against the bottom surface of the cup-shaped member, or may face the bottom surface with a gap therebetween.

The annular sealing member is disposed to be abutted against the bottom surface of the cup-shaped member and the inner wall surface of the cylindrical member, and may be further abutted against the transfer charge container.

The annular sealing member may be formed of rubber, a resin, or metal.

When an igniter is actuated, the transfer charge container is broken and a transfer charge in the transfer charge container is ignited and burnt to generate a combustion product (a flame and a high-temperature combustion gas).

Part of the combustion product flows from the first communication hole of the cylindrical member into the first space to ignite and burn the gas generating agent, and a combustion gas is generated.

A forming position and the number of the first communication hole are determined in view of an ignition property of the gas generating agent in the first space.

The remaining part of the combustion product flows from the second communication hole in the bottom surface of the cup-shaped member into the second space to ignite and burn the gas generating agent, and a combustion gas is generated. At this time, since the annular sealing member is disposed, no combustion product passes through a contact portion between the inner wall surface of the cylindrical member and the circumferential wall of the cup-shaped member.

Out of the combustion product generated by combustion of the transfer charge, a prescribed amount to be provided into the second space is secured, so that, in particular, the ignition performance of the gas generating agent in the second space is maintained and an ignition property and a combustion property of the whole gas generating agent are improved.

The combustion gas generated in the first and second spaces is discharged from the gas discharge port.

It is preferable in the inventions of the first and second aspects that the entire bottom surface of the cup-shaped member and the entire or part of the circumferential wall of the cup-shaped member are positioned inside the cylindrical member, and the entire or part of the circumferential wall of the cup-shaped member is abutted against the inner wall surface of the cylindrical member.

It is preferable in the inventions of the first and second aspects that the entire cup-shaped member is positioned inside the cylindrical member, and an outer surface of the circumferential wall of the cup-shaped member and the inner wall surface of the cylindrical member are abutted against each other.

When the entire cup-shaped member is positioned inside the cylindrical member, a contact area between the outer surface of the circumferential wall of the cup-shaped member and the inner wall surface of the cylindrical member increases, and a sealing effect of the annular sealing member and a leakage preventing effect of the combustion product are preferably more enhanced.

The cup-shaped member is preferably press-fitted to the inside of the cylindrical member.

It is preferable in the inventions of the first and second aspect that the bottom surface of the cup-shaped member has an annular bottom surface formed at a circumferential edge of the bottom surface, an annular wall surface protruding from the annular bottom surface and a circular bottom surface surrounded by the annular wall surface, the entire cup-shaped member is positioned inside the cylindrical member, and the circumferential wall of the cup-shaped member and the inner wall surface of the cylindrical member are abutted against each other, and the annular sealing member is fitted into an annular groove surrounded by the annular bottom surface of the cup-shaped member, the annular wall surface of the cup-shaped member and the inner wall surface of the cylindrical member.

When the annular sealing member is fitted into the annular groove, the annular sealing member is pressed from the both sides by the annular wall surface of the cup-shaped member and the inner wall surface of the cylindrical member and fixed thereby, so that the combustion product is prevented from leaking from a contact portion between the circumferential wall of the cup-shaped member and the inner wall surface of the cylindrical member.

When the transfer charge container is used as in the invention of the second aspect, the annular sealing member may be also abutted against the transfer charge container.

It is preferable in the invention of the second aspect that the bottom surface of the cup-shaped member has an annular bottom surface formed at a circumferential edge of the bottom surface, an annular wall surface protruding from the annular bottom surface and a circular bottom surface surrounded by the annular wall surface, the annular bottom surface of the cup-shaped member is abutted against an annular end surface at an opening of the cylindrical member on the side of the top plate of the housing, and the annular wall surface of the cup-shaped member is abutted against the inner wall surface of the cylindrical member, and the annular sealing member is fitted in a state of being in contact with the inner wall surface of the cylindrical member, the circular bottom surface and the transfer charge container.

When the transfer charge container is used, the annular sealing member is disposed in a state of being in contact with the inner wall surface of the cylindrical member, the circular bottom surface of the cup-shaped member and the transfer charge container, so that the combustion product is prevented from leaking from a contact portion between the annular wall surface of the cup-shaped member and the inner wall surface of the cylindrical member.

It is preferable in the invention of the second aspect that the bottom surface of the cup-shaped member has an annular bottom surface formed at a circumferential edge of the bottom surface, an annular wall surface protruding from the annular bottom surface and a circular bottom surface surrounded by the annular wall surface, the annular bottom surface of the cup-shaped member is abutted against an annular end surface at an opening of the cylindrical member on the side of the top plate of the housing and the annular wall surface of the cup-shaped member is abutted against the inner wall surface of the cylindrical member, the transfer charge container is a column-shaped container having a bottom surface on the side of the igniter, a top surface on the side of the cup-shaped member and a circumferential wall surface, and the top surface has an annular top surface formed at a circumferential edge of the top surface, an annular wall surface protruding from the annular top surface and a circular top surface surrounded by the annular wall surface, and the annular sealing member is fitted into an annular space surrounded by the inner wall surface of the cylindrical member, the circular bottom surface of the cup-shaped member, the annular top surface of the transfer charge container, and the annular wall surface of the transfer charge container.

When the annular sealing member is fitted into the annular space, the annular sealing member is pressed from all directions and fixed thereby, and the combustion product is prevented from leaking from the contact portion between the annular wall surface of the cup-shaped member and the inner wall surface of the cylindrical member.

In the present invention, out of the combustion product generated by combustion of the transfer charge, the combustion product to be provided into the second space ignites and burns the whole amount of the gas generating agent inside the second space.

Therefore, an ignition property and a combustion property of the whole gas generating agent inside the combustion chamber including the first and second spaces are improved.

The gas generator of the present invention is usable for an airbag apparatus mounted in an automobile.

Embodiments of the Invention

(1) Gas Generator Shown in FIG. 1

A gas generator 1 includes a housing 10 in which a diffuser shell 11 and a closure shell 21 are welded at a contact portion.

The diffuser shell 11 has a top plate 12 and an upper circumferential wall 13, and a flange 14 is provided at an opening thereof. A plurality of gas discharge ports 15 are formed in the upper circumferential wall 13.

The closure shell 21 has a bottom plate 22 and a lower circumferential wall 23, and a hole for attaching an igniter 25 is formed in a central portion of the bottom plate 22.

The igniter 25 is an igniter used in a known gas generator, in which, for example, an igniter collar 26 is integrated by a resin with an igniter main body having ignition portion 27.

The igniter 25 is attached by the igniter collar 26 fitted into the hole in the bottom plate 22 of the closure shell 21.

In the igniter collar 26, an outer diameter of a portion (a larger diameter portion) positioned inside the housing 10 is larger than an outer diameter of a portion (a smaller diameter portion) positioned outside the housing 10.

An outer surface of the smaller diameter portion is abutted against the hole, and an annular surface between the larger diameter portion and the smaller diameter portion is abutted against an inner surface of the bottom plate 22.

A cylindrical member 30 is disposed inside the housing 10 along the axis X of the housing 10.

In the cylindrical member 30, a plurality of first communication holes 32 are formed in a circumferential wall 31 thereof, an opening 33 at a first end thereof on the side of the bottom plate 22 is fitted from the outside to the igniter collar 26 protruding in the housing 10, and the first end is abutted against the bottom plate 22. An opening 34 at a second end faces the top plate 12, being spaced slightly therefrom.

A forming position of the plurality of first communication holes 32 is not limited as long as a combustion product generated by combustion of the transfer charge is discharged therefrom into the first space 35.

The cylindrical member 30 on the side of the opening 33 at the first end is press-fitted to the igniter collar 26.

A transfer charge container 40 is disposed inside the cylindrical member 30 in a state of facing the ignition portion 27 of the igniter 25.

The transfer charge container 40 is a column-shaped container formed of aluminum, and a transfer charge used in a known gas generator is accommodated therein.

In the transfer charge container 40, a bottom surface 41 thereof is abutted against the ignition portion 27 of the igniter 25 and a top surface 42 thereof faces a bottom surface 51 of a cup-shaped member 50.

In the gas generator 1 in FIG. 1, a transfer charge may be charged directly inside the cylindrical member 30 without using the transfer charge container 40.

The cup-shaped member 50 is disposed inside the cylindrical member 30.

The cup-shaped member 50 has the s-bottom surface 51, a circumferential wall 52 and an opening 53, and a plurality of second communication holes 54 are formed in the bottom surface 51.

The cup-shaped member 50 is disposed such that the entire circumferential wall 52 thereof is abutted against an inner wall surface 31a of the circumferential wall 31 of the cylindrical member 30, the opening 53 is located on the side of the top plate 12, and the bottom surface 51 faces the transfer charge container 40.

The cup-shaped member 50 is press-fitted into the cylindrical member 30.

The bottom surface 51 and the transfer charge container 40 face each other with a gap therebetween, but they may be partially in contact with each other.

An annular sealing member 60 is disposed in a state of being abutted against the bottom surface 51 of the cup-shaped member 50, the inner wall surface 31a of the circumferential wall 31 of the cylindrical member 30 and the top surface 42 of the transfer charge container 40.

The annular sealing member 60 functions to prevent the combustion product, which is generated by combustion of the transfer charge during actuation, from passing through a contact portion between the inner wall surface 31a of the circumferential wall 31 and the outer wall surface of the circumferential wall 52 of the cup-shaped member 50.

A gas generating agent 61 is charged in a first space 35 outside the cylindrical member 30 and a second space 55 inside the cup-shaped member 50.

The first space 35 and the second spaces 55 together form a combustion chamber. With such a structure that the cup-shaped member 50 is press-fitted into the cylindrical member 30 as shown in FIG. 1, even when an amount of the transfer charge varies, a position of the cup-shaped member 50 is adjusted arbitrarily. The gas generating agent 61 in the second space 55 which is relatively difficult to be ignited is reliably ignited because of the structure of the present invention.

Next, an operation of the gas generator 1 shown in FIG. 1 will be described.

When the igniter 25 is actuated, the transfer charge container 40 disposed right above the igniter 25 is cleaved by a flame generated from the ignition portion 27, and the transfer charge therein burns to generate a combustion product.

Part of the generated combustion product flows into the first space 35 through the first communication holes 32 of the cylindrical member 30 to ignite and burn the gas generating agent 61.

The remaining part of the generated combustion product flows into the second space 55 through the second communication holes 54 of the cup-shaped member 50 to ignite and burn the gas generating agent 61. In this case, upon receiving a pressure of the combustion product, the annular sealing member 60 is pressed against an abutting portion between the inner wall surface 31a of the circumferential wall 31 of the cylindrical member 30 and the circumferential wall 52 of the cup-shaped member 50, and thereby, the combustion product is prevented from leaking from the abutting portion. As a result, the whole remaining part of the generated combustion product flows into the second space 55 through the second communication holes 54.

In this way, since the whole amount of the combustion product generated by combustion of the transfer charge is used to burn the gas generating agent 61 in the first and second spaces 35 and 55, an ignition property of the whole gas generating agent 61 is improved.

Moreover, since the gas generating agent 61 inside the second space 55 of the cup-shaped member 50 is burnt independently from the gas generating agent 61 in the first space 35 and the combustion gas generated thereby flows into the first space 35, an ignition property of the gas generating agent 61 at a position distant from the first communication holes 32 is also improved. Therefore, the ignition property of the gas generating agent 61 in the entire combustion chamber (the first and second spaces 35 and 55) is improved.

The combustion gas generated in the first and second spaces 35 and 55 is discharged from the gas discharge ports 15.

(2) Gas Generator in FIG. 2

A gas generator 1A shown in FIG. 2 is the same as the gas generator 1 in FIG. 1 except that a shape of a cup-shaped member 150 is different from that in the gas generator 1 in FIG. 1, and in relation with this, an arrangement state of an annular sealing member 60 in the gas generator 1A is different from that in the gas generator 1.

The cup-shaped member 150 has a bottom surface, a circumferential wall 151 and an opening 152. The bottom surface includes an annular bottom surface 153 at a circumferential edge, an annular wall surface 154 protruding from the annular bottom surface 153 and a circular bottom surface 155 surrounded by the annular wall surface 154. A plurality of second communication holes 156 are formed in the circular bottom surface 155.

The cup-shaped member 150 is disposed such that the entire circumferential wall 151 thereof is abutted against an inner wall surface 31a of a circumferential wall 31 of a cylindrical member 30, the opening 152 is located on the side of a top plate 12, and the circular bottom surface 155 faces a transfer charge container 40.

The annular sealing member 60 is fitted into an annular groove 70 surrounded by the annular bottom surface 153 of the cup-shaped member 150, the annular wall surface 154 of the cup-shaped member 150 and the inner wall surface 31a of the circumferential wall 31 of the cylindrical member 30.

The annular sealing member 60 is pressed from the both sides by the annular wall surface 154 of the cup-shaped member 150 and the inner wall surface 31a of the cylindrical member 30 and fixed thereby.

Upon receiving a pressure of the combustion product, the annular sealing member 60 is pressed to the annular bottom surface 153 of the cup-shaped member 150 so that the combustion product is prevented from leaking from an abutting portion between the inner wall surface 31a of the cylindrical member 30 and the circumferential wall 151 of the cup-shaped member 150.

Thereby, similarly to the gas generator 1 in FIG. 1, since the whole amount of the combustion product generated by combustion of the transfer charge is used to burn a gas generating agent 61 in first and second spaces 35 and 55, an ignition property of the whole gas generating agent 61 is improved.

(3) Gas Generator in FIG. 3

A gas generator 1B shown in FIG. 3 is the same as the gas generator 1A in FIG. 2 except that a length of a cylindrical member is shorter than that in the gas generator LA in FIG. 2 and an attachment state of the cylindrical member and a cup-shaped member in the gas generator 1B is different from that in the gas generator 1A.

A cylindrical coolant-filter 80 is used in the gas generator 1B in FIG. 3, and a cylindrical coolant-filter can be also used in the gas generator 1 in FIG. 1, the gas generator 1A in FIG. 2 and a gas generator 1C in FIG. 4.

The cylindrical member 30 is disposed inside a housing 10 along the axis X of the housing 10.

In the cylindrical member 30, a plurality of first communication holes 32 are formed in a circumferential wall 31 thereof, and an opening 33 at a first end thereof is fitted from the outside to an igniter collar 26 protruding in the housing 10.

The opening 33 at the first end of the cylindrical member 30 is press-fitted to the igniter collar 26.

The cylindrical member 30 has the same shape and structure as those of the cylindrical members 30 in FIGS. 1 and 2 but has a length shorter than that of the cylindrical members 30 in FIGS. 1 and 2.

In the cylindrical coolant-filter 80, a lower portion (on the side of the bottom plate 22) of an outer circumferential surface 80a is abutted against a lower circumferential wall 23 of the closure shell 21, a lower end surface 81 is abutted against a bottom plate 22, and an upper end surface 82 is abutted against a top plate 12.

A cylindrical space 19 is formed between an upper portion (on the side of the top plate 12) of the outer circumferential surface 80a and gas discharge ports 15.

A first space 35 is surrounded by the cylindrical coolant-filter 80 radially from the outside.

A transfer charge container 40 is disposed in the cylindrical member 30 in a state of being abutted against an ignition portion 27 of an igniter 25.

The transfer charge container 40 is a column-shaped container formed of aluminium, and a transfer charge used in a known gas generator is accommodated therein.

A cup-shaped member 150 has the same shape as the cup-shaped member 150 in FIG. 2 and has a bottom surface, a circumferential wall 151 and an opening 152. The bottom surface has an annular bottom surface 153 at a circumferential edge, an annular wall surface 154 protruding from the annular bottom surface 153, and a circular bottom surface 155 surrounded by the annular wall surface 154.

A plurality of second communication holes 156 are formed in the circular bottom surface 155.

The cup-shaped member 150 is disposed such that the annular bottom surface 153 is abutted against an annular end surface 34a of an opening at a second end (see the openings 34 at the second ends in FIG. 1 and FIG. 2) of the cylindrical member 30 and the annular wall surface 154 is abutted against an inner wall surface 31a of the cylindrical member 30.

The cup-shaped member 150 is disposed such that the opening 152 is located on the side of the top plate 12 and the circular bottom surface 155 faces the transfer charge container 40.

The cup-shaped member 150 may be press-fitted or partially welded to the cylindrical member 30 to be fixed.

When the cylindrical member 30 and the cup-shaped member 150 are welded in the state illustrated in FIG. 3, these members are welded in advance and the transfer charge container 40 is incorporated therein to be disposed inside the housing 10, in order to avoid influence of the welding on the transfer charge container 40.

An annular sealing member 60 is disposed in a state of being in contact with the circular bottom surface 155 of the cup-shaped member 150, the inner wall surface 31a of the cylindrical member 30 and a top surface 42 of the transfer charge container 40.

Since the annular sealing member 60 is pressed against the circular bottom surface 155 of the cup-shaped member 150 upon receiving a pressure of the combustion product during actuation, the combustion product is prevented from leaking from an abutting portion between the inner wall surface 31a of the cylindrical member 30 and the annular wall surface 154 of the cup-shaped member 150.

Therefore, similarly to the gas generator 1 in FIG. 1, since the whole amount of the combustion product generated by combustion of the transfer charge is used to burn a gas generating agent 61 in the first space 35 and a second space 55, an ignition property of the whole gas generating agent 61 is improved.

Such a combination of the cylindrical member 30 and the cup-shaped member 150 as shown in FIG. 3 decreases a distance for press-fitting the cup-shaped member 150 with respect to the cylindrical member 30. When press-fitting and welding are conducted together, the welding may be conducted partially (approximately at three positions on the circumference) to such an extent that the cup-shaped member 150 is not detached from the cylindrical member 30, which facilitates assembling and decreases the press-fitting distance.

(4) Gas Generator in FIG. 4

A gas generator 1C in FIG. 4 is the same as the gas generator 1B in FIG. 3 except that a shape of a transfer charge container is different from that in the gas generator 1B in FIG. 3, and in relation with this, an arrangement state of an annular sealing member is different.

A transfer charge container 140 is a column-shaped container having a bottom surface 141 on the side of an igniter 25, a top surface on the side of a cup-shaped member 150 and a circumferential wall surface 142. Furthermore, the top surface has an annular top surface 143 at a circumferential edge, an annular wall surface 144 protruding from the annular top surface 143 and a circular top surface 145 surrounded by the annular wall surface 144.

The annular sealing member 60 is fitted into an annular space surrounded by an inner wall surface 31a of a cylindrical member 30, a circular bottom surface 155 of the cup-shaped member 150, the annular top surface 143 of the transfer charge container 140 and the annular wall surface 144 of the transfer charge container 140.

Since the annular sealing member 60 is pressed against the circular bottom surface 155 of the cup-shaped member 150 and the inner wall surface 31a of the cylindrical member 30 upon receiving a pressure of the combustion product during actuation, the combustion product is prevented from leaking from an abutting portion between the inner wall surface 31a of the cylindrical member 30 and the annular wall surface 154 of the cup-shaped member 150.

Therefore, similarly to the gas generator 1 in FIG. 1, since the whole amount of the combustion product generated by combustion of the transfer charge is used to burn a gas generating agent 61 in first and second spaces 35 and 55, an ignition property of the whole gas generating agent 61 is improved.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a top plate, a bottom plate and a circumferential wall formed with a gas discharge port, in the housing,
a cylindrical member being disposed along an axis of the housing and having a first communication hole in a circumferential wall thereof,
an igniter being disposed inside the cylindrical member and in contact with the bottom plate of the housing,
a transfer charge being charged in a space accommodating an ignition portion of the igniter inside the cylindrical member,
a cup-shaped member including a bottom surface, a circumferential wall and an opening and being disposed such that at least part of the circumferential wall is abutted against an inner wall surface of the cylindrical member, the opening being located on the side of the top plate of the housing and the bottom surface having a second communication hole facing the transfer charge,
a gas generating agent being charged in a first space outside of the cylindrical member and in a second space inside the cup-shaped member, and
an annular sealing member provided separately from the cup-shaped member and being disposed to be abutted against at least the bottom surface of the cup-shaped member and the inner wall surface of the cylindrical member, the annular sealing member preventing a combustion product generated by combustion of the transfer charge from passing through a contact portion between the inner wall surface of the cylindrical member and an outer wall of the cup-shaped member.

2. The gas generator according to claim 1, wherein an entire bottom surface of the cup-shaped member and at least a part of the circumferential wall of the cup-shaped member are positioned inside the cylindrical member, and at least a part of the circumferential wall of the cup-shaped member is abutted against the inner wall surface of the cylindrical member.

3. The gas generator according to claim 1, wherein the bottom surface of the cup-shaped member has an annular bottom surface formed at a circumferential edge of the bottom surface, an annular wall surface protruding from the annular bottom surface and a circular bottom surface surrounded by the annular wall surface,
an entire cup-shaped member is positioned inside the cylindrical member, and the circumferential wall of the cup-shaped member and the inner wall surface of the cylindrical member are abutted against each other, and
the annular sealing member is fitted into an annular groove surrounded by the annular bottom surface of the cup-shaped member, the annular wall surface of the cup-shaped member and the inner wall surface of the cylindrical member.

4. The gas generator according to claim 1, wherein the annular sealing member is formed of rubber.

5. The gas generator according to claim 1, wherein the annular sealing member is formed of resin.

6. A gas generator, comprising:
a housing having a top plate, a bottom plate and a circumferential wall formed with a gas discharge port, in the housing,
a cylindrical member being disposed along an axis of the housing and having a first communication hole in a circumferential wall thereof,
an igniter being disposed inside the cylindrical member and in contact with the bottom plate of the housing,
a transfer charge container being charged with a transfer charge and disposed to face an ignition portion of the igniter inside the cylindrical member,
a cup-shaped member including a bottom surface, a circumferential wall and an opening and being disposed such that at least part of the circumferential wall is abutted against an inner wall surface of the cylindrical member, the opening being located on the side of the top plate of the housing and the bottom surface having a second communication hole facing the transfer charge container,
a gas generating agent being charged in a first space outside the cylindrical member and in a second space inside the cup-shaped member, and an annular sealing member provided separately from the transfer charge container and the cup-shaped member and being disposed to be abutted against at least the bottom surface of the cup-shaped member and the inner wall surface of the cylindrical member, the annular sealing member preventing a combustion product generated by combustion of the transfer charge from passing through a contact portion between the inner wall surface of the cylindrical member and an outer wall of the cup-shaped member.

7. The gas generator according to claim 6, wherein the bottom surface of the cup-shaped member has an annular bottom surface formed at a circumferential edge of the bottom surface, an annular wall surface protruding from the annular bottom surface and a circular bottom surface surrounded by the annular wall surface,
the annular bottom surface of the cup-shaped member is abutted against an annular end surface at an opening of the cylindrical member on the side of the top plate of the housing, and the annular wall surface of the cup-shaped member is abutted against the inner wall surface of the cylindrical member, and
the annular sealing member is fitted in a state of being in contact with the inner wall surface of the cylindrical member, the circular bottom surface and the transfer charge container.

8. The gas generator according to claim 6, wherein the bottom surface of the cup-shaped member has an annular bottom surface formed at a circumferential edge of the bottom surface, an annular wall surface protruding from the annular bottom surface and a circular bottom surface surrounded by the annular wall surface,
the annular bottom surface of the cup-shaped member is abutted against an annular end surface at an opening of the cylindrical member on the side of the top plate of the housing and the annular wall surface of the cup-shaped member is abutted against the inner wall surface of the cylindrical member,
the transfer charge container is a column-shaped container having a bottom surface on the side of the igniter, a top surface on the side of the cup-shaped member and a circumferential wall surface, and the top surface has an annular top surface formed at a circumferential edge of the top surface, an annular wall surface protruding from the annular top surface and a circular top surface surrounded by the annular wall surface, and
the annular sealing member is fitted into an annular space surrounded by the inner wall surface of the cylindrical member, the circular bottom surface of the cup-shaped member, the annular top surface of the transfer charge container, and the annular wall surface of the transfer charge container.

9. The gas generator according to claim 6, wherein an entire bottom surface of the cup-shaped member and at least a part of the circumferential wall of the cup-shaped member are positioned inside the cylindrical member, and at least a part of the circumferential wall of the cup-shaped member is abutted against the inner wall surface of the cylindrical member.

10. The gas generator according to claim 6, wherein the bottom surface of the cup-shaped member has an annular bottom surface formed at a circumferential edge of the bottom surface, an annular wall surface protruding from the annular bottom surface and a circular bottom surface surrounded by the annular wall surface,
an entire cup-shaped member is positioned inside the cylindrical member, and the circumferential wall of the cup-shaped member and the inner wall surface of the cylindrical member are abutted against each other, and
the annular sealing member is fitted into an annular groove surrounded by the annular bottom surface of the cup-shaped member, the annular wall surface of the cup-shaped member and the inner wall surface of the cylindrical member.

11. The gas generator according to claim 6, wherein the annular sealing member is formed of rubber.

12. The gas generator according to claim 6, wherein the annular sealing member is formed of resin.

* * * * *